March 20, 1962 H. G. ZIMMERMAN 3,025,849
PORTABLE FOLDING STOVE

Filed April 7, 1960 2 Sheets-Sheet 1

*INVENTOR.*
HENRY G. ZIMMERMAN
BY
*ATTORNEY*

March 20, 1962 H. G. ZIMMERMAN 3,025,849
PORTABLE FOLDING STOVE
Filed April 7, 1960 2 Sheets-Sheet 2

INVENTOR.
HENRY G. ZIMMERMAN
BY
ATTORNEY

United States Patent Office 3,025,849
Patented Mar. 20, 1962

3,025,849
PORTABLE FOLDING STOVE
Henry G. Zimmerman, 250 Lexington Ave.,
New York, N.Y.
Filed Apr. 7, 1960, Ser. No. 20,675
1 Claim. (Cl. 126—43)

This invention concerns a compact folding stove especially adapted for portability in a small space.

The invention is particularly adapted for use by campers, hikers, travelers, skiers, etc. According to the invention there is provided a folding stove with hinged legs. The legs can be extended in parallel positions and fitted into recesses in legs of a base or stand adapted to support a can of fuel, a heating candle or the like. The legs are hinged to a grate adapted to support a cooking utensil a predetermined distance above the source of heat mounted on the base. In a further form of the invention there is provided a trivet adapted to support a heated pot while another utensil is being heated on the stove. The trivet is adapted to be adjustably supported on the stove above the grate to keep a pot warm.

It is therefore one object of the invention to provide a collapsible stove including a circular grate with hinged legs, and a stand for supporting a source of heat, the stand being adapted to retain the hinged legs in fixed disposition.

Another object is to provide a collapsible stove of the type described with a trivet adjustably mountable on the stove.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
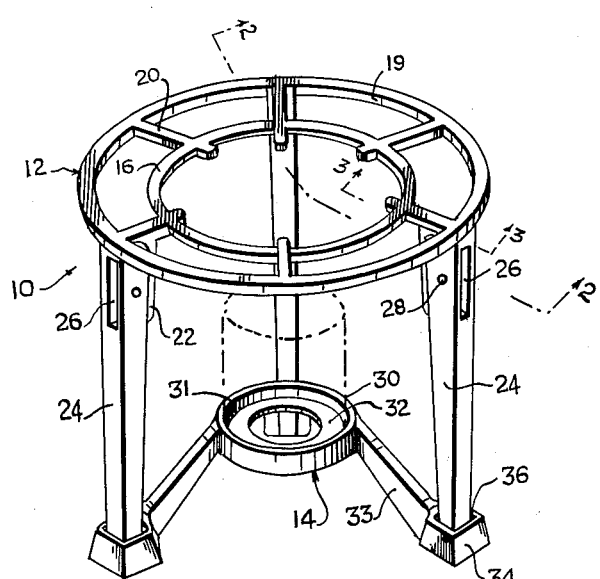
FIG. 1 is a perspective view of the stove embodying the invention.
Figure 3:
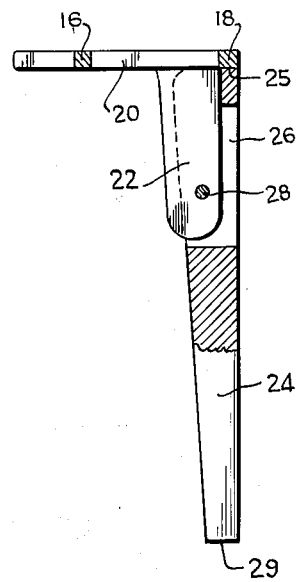
FIG. 3 is a sectional view on an enlarged scale showing details of a hinged leg, taken on line 3—3 of FIG. 1.
Figure 4:
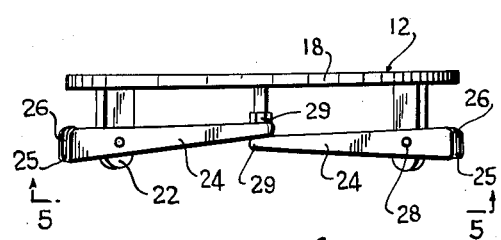
FIG. 4 is a side elevational view of the grate and legs in a collapsed position.
Figure 5:
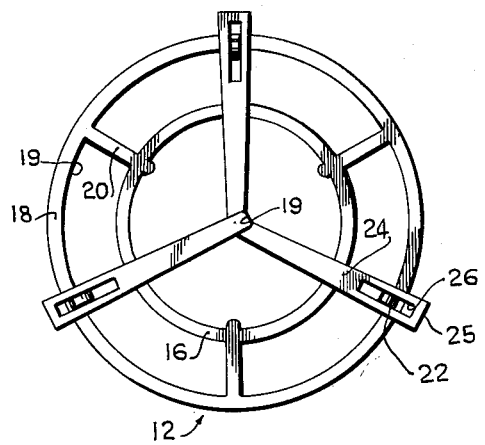
FIG. 5 is a bottom plan view of the collapsed grate and legs taken on line 5—5 of FIG. 4.
Figure 6:
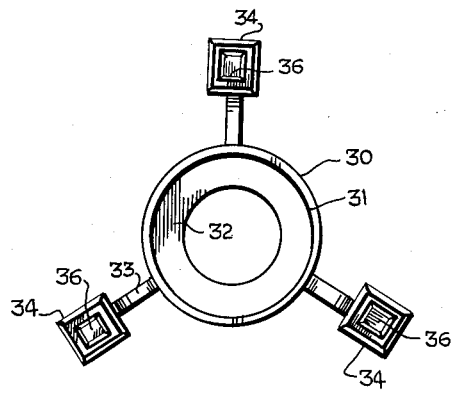
FIG. 6 is a top plan view of the stand or base per se.

Referring to FIGS. 1–6, there is shown a stove 10 including a circular frame 12 serving as a grate and a stand 14 serving as a base. The frame 12 includes inner and outer concentric rings 16, 18 joined by radially extending, integral ribs 20 equally spaced around the frame. Alternate ribs are formed with depending flat posts 22 located between the rings but closer to the outer ring 18. Three legs 24 are provided for supporting the frame. Each leg has a slot 26 in its upper portion in which fits one of the flat posts 22. A pintle 28 extends through sides of the leg and the post so that the leg is pivotally attached to the frame. FIGS. 3 and 4 show how the legs 24 can be collapsed by turning them inwardly so that their free ends 29 overlay each other at the center of the frame. The legs are generally tapered in form, being wider at the top 25 and narrower at the bottom ends 29.

The stand 14 includes a central ring 30 formed with a radially extending annular ledge 32 for supporting a can C of fuel. The ring has an upstanding cylindrical wall 31 for retaining the can on the ledge. The ring is supported by three radially extending, downwardly inclined legs 33 terminating in cupped feet 34. Each foot has a rectangular recess 36 adapted to receive the end 29 of one of the legs 24 of the frame 12, as clearly shown in FIG. 6.

Figure 2:
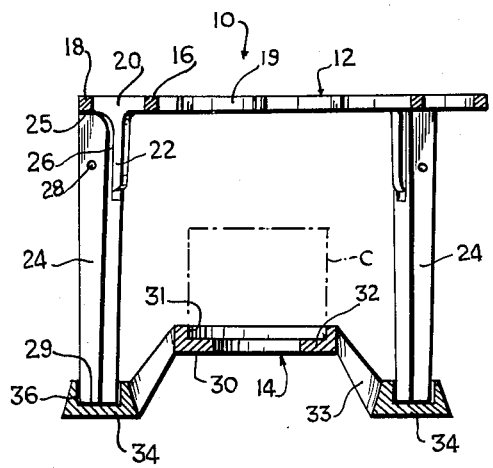
FIG. 2 is a vertical sectional view taken on line 2—2 of FIG. 1.

The stand and frame are readily separable since they are not attached to each other. While the frame is mounted on the stand, however, the legs are prevented from turning so that the frame is solidly and rigidly supported. The tops 25 of the legs 24 abut the underside of ring 18 when the legs are extended perpendicular to the plane of the ring so that the legs cannot turn outwardly as shown in FIG. 2. The legs 24 are thus limited only to movement inwardly toward each other when they are clear of the stand.

Figure 7:
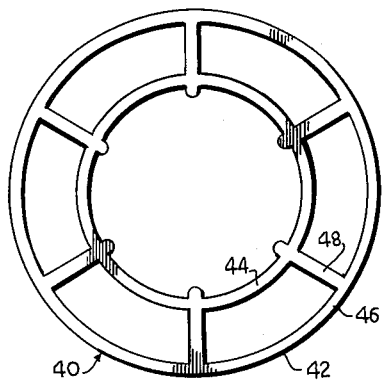
FIG. 7 is a top plan view of the trivet.
Figure 9:
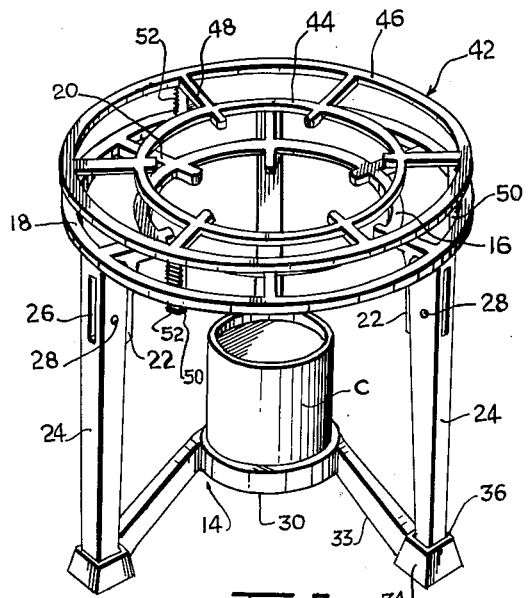
FIG. 9 is a perspective view similar to FIG. 1 showing the trivet adjustably mounted on the stove.
Figure 8:
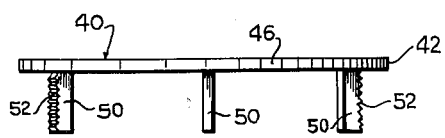
FIG. 8 is a side elevational view of the trivet.

In FIGS. 7–9 there is shown a trivet 40 which includes a circular frame 42 formed with inner and outer concentric circular rings 44, 46 joined by integral ribs 48 circumferentially spaced like ribs 20 on frame 12. Three short legs 50 depend rigidly from alternate ones of the ribs 48. The legs are formed with serrated outer sides 52 adapted to grip the inner edge 19 of ring 18 so that the frame 42 can be adjustably spaced above the frame 12 as clearly shown in FIG. 9.

If desired, the stove can be assembled with the trivet mounted on the frame 12 and a cooking utensil such as a pot can be placed on the trivet. Thus the pot can be adjustably spaced from the flame produced when the contents of the open can C are ignited.

The trivet can also be mounted on the stand 14 with the legs 50 disposed in recesses 36. This will place the plane of frame 12 quite close to the ring 30.

The frames 12 and 42 and the stand 14 may be made of light metal such as aluminum so that the stove can easily be carried in a small space when collapsed.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A collapsible stove comprising a circular frame including a pair of concentric rings, a plurality of ribs extending radially and integrally connecting the rings, said ribs being circumferentially spaced between the rings, certain of said ribs having depending integral posts, and a plurality of legs side by side and pivotally secured to said posts intermediate the ends thereof, said legs being pivotable radially inwardly so that free ends overlay each other at the center of the frame; and a stand, said stand including a ring having an annular inner ledge for supporting a cylindrical container constituting a source of heat thereon, a plurality of other legs extending radially outwardly and downwardly from the latter ring, said other legs terminating in feet having upwardly opening recesses receiving said free ends of the first-named legs to prevent inward collapsing movement thereof, whereby said frame is supported a fixed distance above said ring; and a trivet adjustably supported on said frame, said trivet including another pair of concentric, coplanar rings, a plurality of other ribs connecting said other pair of rings and circumferentially spaced therebetween, and a plurality of short legs depending rigidly from certain of said other ribs, said short legs being adjustably engaged on one of the first-named rings for adjustable spacing of said other rings from said stand.

(References on following page)

References Cited in the file of this patent

UNITED STATES PATENTS

| | | |
|---|---|---|
| 162,924 | Houchin | May 4, 1875 |
| 561,857 | Baxter | June 9, 1896 |
| 931,557 | Barney | Aug. 17, 1909 |
| 954,703 | Savage et al. | Apr. 12, 1910 |
| 1,010,323 | Shaeffer | Nov. 28, 1911 |
| 1,181,578 | Di Primio | May 2, 1916 |
| 1,272,995 | Piotrowski | July 16, 1918 |
| 2,283,324 | Faber | May 19, 1942 |
| 2,669,117 | Fuhrmann | Feb. 16, 1954 |
| 2,879,761 | Foster et al. | Mar. 31, 1959 |

FOREIGN PATENTS

| | | |
|---|---|---|
| 115,289 | Germany | Nov. 22, 1900 |

OTHER REFERENCES

Hilo Publication, Union Steel Products Co., Albion, Michigan.